United States Patent
Kosakowski et al.

(10) Patent No.: US 11,846,457 B2
(45) Date of Patent: Dec. 19, 2023

(54) TRANSPORTATION REFRIGERATION MODULAR UNIT

(71) Applicant: Carrier Corporation, Palm Beach Gardens, FL (US)

(72) Inventors: Chad Kosakowski, Palm Beach Gardens, FL (US); Paul J. Spaulding, Palm Beach Gardens, FL (US)

(73) Assignee: Carrier Corporation, Palm Beach Gardens, FL (US)

( * ) Notice: Subject to any disclaimer, the term of this patent is extended or adjusted under 35 U.S.C. 154(b) by 360 days.

(21) Appl. No.: 17/045,951

(22) PCT Filed: Feb. 26, 2019

(86) PCT No.: PCT/US2019/019523
§ 371 (c)(1),
(2) Date: Oct. 7, 2020

(87) PCT Pub. No.: WO2019/199387
PCT Pub. Date: Oct. 17, 2019

(65) Prior Publication Data
US 2021/0146756 A1    May 20, 2021

Related U.S. Application Data

(60) Provisional application No. 62/657,280, filed on Apr. 13, 2018.

(51) Int. Cl.
*B60H 1/32*    (2006.01)
*F25B 5/02*    (2006.01)
(Continued)

(52) U.S. Cl.
CPC ............... *F25B 5/02* (2013.01); *B60H 1/323* (2013.01); *B60H 1/3232* (2013.01); *B60H 1/3421* (2013.01); *F25B 41/22* (2021.01)

(58) Field of Classification Search
CPC .......... F25B 5/02; F25B 41/22; F25D 11/003; F25D 2400/32; B60H 1/3226; B60H 1/3421; B60H 1/3232; B60H 1/323
See application file for complete search history.

(56) References Cited

U.S. PATENT DOCUMENTS

| 4,221,421 A | 9/1980 | Bettker |
| 4,549,405 A | 10/1985 | Andrson |

(Continued)

FOREIGN PATENT DOCUMENTS

| DE | 19505403 | 8/1996 | |
| GB | 794796 A | * 5/1958 | ........... B60H 1/3211 |

(Continued)

OTHER PUBLICATIONS

International Search Report and Written Opinion for International Application No. PCT/US2019/019523 dated May 17, 2019.

(Continued)

*Primary Examiner* — Miguel A Diaz
(74) *Attorney, Agent, or Firm* — Carlson, Gaskey & Olds, P.C.

(57) ABSTRACT

A transportation refrigeration assembly includes a modular heat exchanger unit that includes at least one absorption heat exchanger and at least one expansion device. A frame supports the modular heat exchanger unit. A first cooling air outlet is in fluid communication with the modular heat exchanger unit. A second cooling air outlet is in fluid communication with the modular heat exchanger unit.

4 Claims, 2 Drawing Sheets

(51) Int. Cl.
  *B60H 1/34* (2006.01)
  *F25B 41/22* (2021.01)

(56) References Cited

U.S. PATENT DOCUMENTS

| | | | |
|---|---|---|---|
| 4,685,306 A | 8/1987 | Howland | |
| 4,899,554 A | 2/1990 | Kato | |
| 4,912,940 A | 4/1990 | Anderson | |
| 5,054,295 A | 10/1991 | Goulooze | |
| 5,129,235 A | 7/1992 | Renken | |
| 5,161,383 A * | 11/1992 | Hanson | B60H 1/3226 62/81 |
| 5,168,713 A * | 12/1992 | Howland | B60H 1/323 62/200 |
| 5,704,676 A | 1/1998 | Hill | |
| 5,916,253 A | 6/1999 | Amr | |
| 6,357,248 B1 | 3/2002 | Bongaards | |
| 6,374,626 B1 | 4/2002 | Takahashi | |
| 6,523,363 B1 | 2/2003 | Gully | |
| 6,543,245 B1 | 4/2003 | Waldschmidt | |
| 6,606,875 B1 | 8/2003 | Grand | |
| 6,626,625 B2 | 9/2003 | Nelson | |
| 6,694,765 B1 | 2/2004 | Waldschmidt | |
| 6,763,670 B1 | 7/2004 | Bushnell | |
| 6,804,972 B2 | 10/2004 | El-Habhab | |
| 7,051,544 B2 | 5/2006 | Hille | |
| 7,614,242 B1 | 11/2009 | Quesada Saborio | |
| 8,037,704 B2 | 10/2011 | Viegas | |
| 8,266,917 B2 | 9/2012 | Waldschmidt | |
| 8,650,895 B2 | 2/2014 | Zapotocky | |
| 10,254,015 B2 * | 4/2019 | Punuru | F25B 5/02 |
| 2003/0192952 A1 * | 10/2003 | Horn | F25B 25/005 165/203 |
| 2010/0107661 A1 | 5/2010 | Awwad | |
| 2011/0126566 A1 * | 6/2011 | Jones | F25B 5/02 62/298 |
| 2015/0316311 A1 | 11/2015 | Kopecka | |
| 2015/0316313 A1 | 11/2015 | Koppineedi | |
| 2016/0272049 A1 | 9/2016 | Renken | |
| 2017/0106726 A1 | 4/2017 | Saroka | |
| 2017/0136844 A1 | 5/2017 | Neu | |
| 2018/0245822 A1 * | 8/2018 | Punuru | F25B 5/02 |
| 2021/0339607 A1 * | 11/2021 | Kaiser | F25B 41/22 |
| 2023/0175742 A1 * | 6/2023 | Luo | B60H 1/005 62/59 |

FOREIGN PATENT DOCUMENTS

| | | | |
|---|---|---|---|
| JP | H05238306 A * | 9/1993 | |
| WO | 2016135524 | 9/2016 | |

OTHER PUBLICATIONS

Preliminary Patentability Report for International Application No. PCT/US2019/019523 dated Oct. 22, 2020.

* cited by examiner

TRANSPORTATION REFRIGERATION MODULAR UNIT

CROSS-REFERENCE TO RELATED APPLICATIONS

This application claims priority to U.S. Provisional Application No. 62/657,280, which was filed on Apr. 13, 2018 and is incorporated herein by reference.

BACKGROUND

This application relates to refrigeration systems having an absorption heat exchanger unit.

Refrigeration systems are known. Generally, a compressor compresses a refrigerant and delivers it into a condenser. The refrigerant is cooled and passes through an expansion valve. The refrigerant is expanded and passes through an evaporator. The evaporator cools air to be delivered into an environment to be conditioned.

One application for such refrigeration systems is in a transportation refrigeration system. As an example, a truck may have a refrigerated trailer. It is known to provide distinct temperatures at distinct compartments within a common trailer. Individual refrigeration circuits are often utilized to provide the distinct temperatures.

SUMMARY

In one exemplary embodiment, a transportation refrigeration assembly includes a modular heat exchanger unit that includes at least one absorption heat exchanger and at least one expansion device. A frame supports the modular heat exchanger unit. A first cooling air outlet is in fluid communication with the modular heat exchanger unit. A second cooling air outlet is in fluid communication with the modular heat exchanger unit.

In a further embodiment of any of the above, the modular heat exchanger unit includes a single refrigerant inlet and a single refrigerant outlet.

In a further embodiment of any of the above, a first nozzle is in fluid communication with the first cooling air outlet and a second nozzle is in fluid communication with the second cooling air outlet.

In a further embodiment of any of the above, at least one expansion device includes a single expansion device and at least one absorption heat exchanger includes a single absorption heat exchanger.

In a further embodiment of any of the above, the single expansion device is downstream of the single refrigerant inlet to the modular heat exchanger unit and upstream of the single refrigerant outlet.

In a further embodiment of any of the above, at least one expansion device includes a first expansion device and a second expansion device. At least one absorption heat exchanger includes a first absorption heat exchanger and a second absorption heat exchanger.

In a further embodiment of any of the above, the first expansion device and the second expansion device are each located downstream of the single refrigerant inlet to the modular heat exchanger unit and upstream of the single refrigerant outlet to the modular heat exchanger unit.

In a further embodiment of any of the above, a first fan is in fluid communication with the first nozzle and a second fan is in fluid communication with the second nozzle.

In a further embodiment of any of the above, the first cooling air outlet is spaced from the second cooling air outlet.

In another exemplary embodiment, a transportation refrigeration system includes a refrigeration circuit that includes a compressor, a condenser, and a modular heat exchanger unit that includes at least one absorption heat exchanger and at least one expansion device. A modular compartment accepts at least one of a first modular heat exchanger unit and a second modular heat exchanger unit. A frame supports the modular compartment. A first cooling air outlet is in fluid communication with the modular compartment. A second cooling air outlet is in fluid communication with the modular compartment.

In a further embodiment of any of the above, the refrigeration circuit includes a single refrigeration circuit outlet to the modular compartment and a single refrigeration circuit inlet from the modular compartment.

In a further embodiment of any of the above, the first cooling air outlet is spaced from the second cooling air outlet.

In a further embodiment of any of the above, at least one absorption heat exchanger includes a single absorption heat exchanger and at least one expansion device includes a single expansion device. The single absorption heat exchanger and the single expansion device are located in the first modular heat exchanger unit.

In a further embodiment of any of the above, a first nozzle is in fluid communication with the first cooling air outlet. A second nozzle is in fluid communication with the second cooling air outlet. A first fan is in fluid communication with the first nozzle and a second fan in fluid communication with the second nozzle.

In a further embodiment of any of the above, at least one absorption heat exchanger includes a first and second absorption heat exchanger. At least one expansion device includes a first and second expansion device. The first and second absorption heat exchangers and the first and second expansion devices are located in the second modular heat exchanger unit.

In a further embodiment of any of the above, a first nozzle is in fluid communication with the first cooling air outlet. A second nozzle is in fluid communication with the second cooling air outlet. A first fan is in fluid communication with the first nozzle and a second fan in fluid communication with the second nozzle.

In another exemplary embodiment, a method of retrofitting a transposition refrigeration assembly includes the steps of removing a first modular heat exchanger unit from a modular compartment of a refrigeration assembly. The refrigeration assembly includes a first cooling fluid outlet and a second cooling fluid outlet. Each is in fluid communication with the modular compartment. A second modular heat exchanger unit is installed in the modular compartment. The first modular heat exchanger unit and the second modular heat exchanger unit include an unequal number of absorption heat exchangers.

In a further embodiment of any of the above, the removing step includes separating a single inlet to the first modular heat exchanger unit from a single outlet from a refrigeration circuit. A single outlet is separated from the first modular heat exchanger unit from a single inlet to the refrigeration circuit.

In a further embodiment of any of the above, the installing step includes attaching the single inlet to the second modular heat exchanger unit with the single outlet from the refrigeration circuit. The single outlet from the second modular heat exchanger unit is attached to the single inlet to the refrigeration circuit.

In a further embodiment of any of the above, one of the first modular heat exchanger unit and the second modular heat exchanger unit includes a pair of expansion devices and a pair of absorption heat exchangers. The other of the first modular heat exchanger unit and the second modular heat exchanger unit includes a single expansion device and a single absorption heat exchanger.

DETAILED DESCRIPTION

Figure 1:
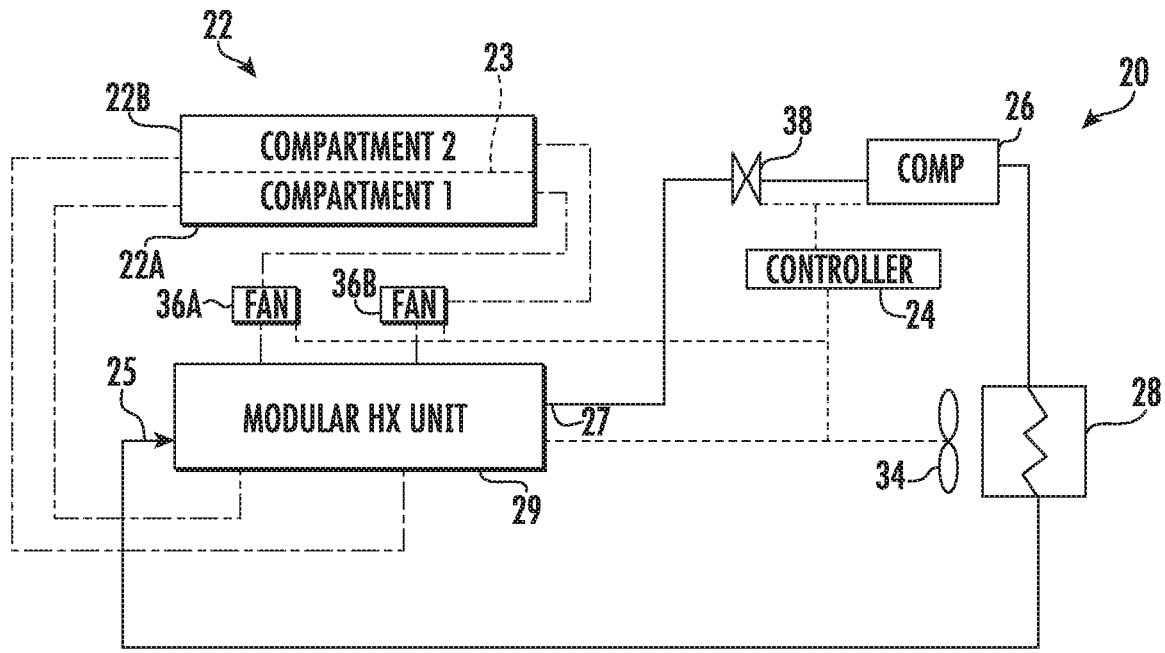
FIG. 1 is a schematic view illustrating a transport refrigeration system.

FIG. 1 illustrates a transport refrigeration system 20 associated with a cargo space 22, such as a refrigerated cargo space. In the illustrated example, the cargo space 22 is divided into a first compartment 22A and a second compartment 22B by a dividing wall 23. However, the dividing wall 23 is removable such that the cargo space 22 only includes a single compartment A controller 24 manages operation of the refrigeration system 20 to establish and regulate a desired product storage temperature within the cargo space 22, such as within the first and second compartments 22A, 22B. The cargo space 22 may be the cargo box of a trailer, a truck, a seaboard shipping container or an intermodal container wherein perishable cargo, such as, for example, produce, meat, poultry, fish, dairy products, cut flowers, and other fresh or frozen perishable products, is stowed for transport.

The refrigeration system 20 includes a refrigerant compression device 26, a refrigerant rejection heat exchanger 28, a modular compartment 29, and an outlet valve 38 connected in a closed loop refrigerant circuit and arranged in a conventional refrigeration cycle. The modular compartment 29 can accept a first modular heat exchanger unit 29A (FIG. 2) having a first expansion device 30A and a first refrigerant absorption heat exchanger 32A. Alternatively, the modular compartment 29 can accept a second modular heat exchanger unit 29B having the first expansion device 30A, a second expansion device 30B, the first refrigerant absorption heat exchanger 32A, and a second refrigerant absorption heat exchanger 32B. Additionally, the first absorption heat exchanger 32A can be a different size when used in the first modular heat exchanger unit 29A and the second modular heat exchanger unit 29B.

The first and second expansion devices 30A, 30B can be electrically controlled expansion valves controlled by the controller 24 to regulator refrigerant flow through each of the first and second absorption heat exchangers 32A, 32B, respectively. The refrigeration system 20 also includes one or more fans 34 associated with the rejection heat exchanger 28 and a first and second fan 36A, 36B associated with the modular unit 29. In one example, the first and second absorption heat exchangers 32A, 32B are evaporators.

It is to be understood that other components (not shown) may be incorporated into the refrigerant circuit as desired, including for example, but not limited to, a suction modulation valve, a receiver, a filter/dryer, an economizer circuit.

The rejection heat exchanger 28 may, for example, comprise one or more refrigerant conveying coiled tubes or one or more tube banks formed of a plurality of refrigerant conveying tubes extending between respective inlet and outlet manifolds. The fan(s) 34 are operative to pass air, typically ambient air, across the tubes of the refrigerant rejection heat exchanger 28 to cool refrigerant vapor passing through the tubes.

The first and second absorption heat exchangers 32A, 32B may, for example, also comprise one or more refrigerant conveying coiled tubes or one or more tube banks formed of a plurality of refrigerant conveying tubes extending between respective inlet and outlet manifolds. When the refrigeration system 20 is used in connection with first modular unit 29A (FIG. 2), the first and second fans 36A, 36B are operative to pass air drawn from the temperature controlled cargo space 22 across the tubes of the first absorption heat exchanger 32A.

When the refrigeration system 20 is used in connection with second modular unit 29B (FIG. 3), the first and second fans 36A, 36B are operative to pass air drawn from the first and second compartments 22A, 22B across the tubes of the first and second absorption heat exchangers 32A, 32B. Alternatively, the second modular unit 29B can be used with a single compartment in the cargo space 22.

With the first and second modular units 29A, 29B, at least one of the first and second absorption heat exchangers 32A, 32B will heat the refrigerant passing through the tubes and cool the air. The air cooled in traversing at least one of the first and second absorption heat exchangers 32A, 32B is supplied back to a respective first and second compartments 22A, 22B in the cargo space 22 or the cargo space 22 as a whole if the dividing wall 23 is not utilized.

Prior to entering the refrigerant compression device 26, the refrigerant passes through the outlet valve 38. The outlet valve 38 controls a pressure and state of the refrigerant entering the refrigerant compression device 26. The refrigerant compression device 26 may comprise a single-stage or multiple-stage compressor such as, for example, a reciprocating compressor or a scroll compressor.

In the refrigeration system 20, the controller 24 is configured for controlling operation of the refrigeration system 20 including, but not limited to, operation of the various components of the refrigeration system 20 to provide and maintain a desired operating temperature within the cargo space 22. The controller 24 may be an electronic controller including a microprocessor and an associated memory bank. The controller 24 controls operation of various components of the refrigeration system 20, such as the refrigerant compression device 26, the first and second expansion devices 30A, 30B, the fans 34, 36A, 36B, and the outlet valve 38.

Figure 2:
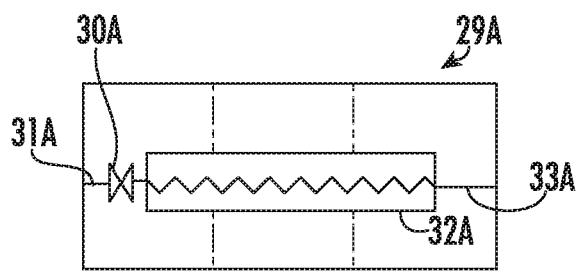
FIG. 2 is a schematic view illustrating an example modular heat exchanger unit for use in the transport refrigeration system of FIG. 1.

FIG. 2 schematically illustrated the first modular unit 29A. The first modular unit 29A includes the first absorption heat exchanger 32A and the first expansion device 30A upstream of the first absorption heat exchanger 32A. A single inlet 31A feeds refrigerant from the refrigeration system 20 into the first modular unit 29A and a single outlet 33A directs the refrigerant from the first modular unit 29A back into the refrigeration system 20. The single inlet 31A attaches to a single outlet 25 (FIG. 1) of the refrigeration system 20 through welding, bonding, brazing, or another similar technique. Similarly, the single outlet 33A of the first modular unit 29A attaches to a single inlet 27 (FIG. 1) of the refrigeration system 20 through welding, bonding, brazing, or another similar technique.

Figure 3:
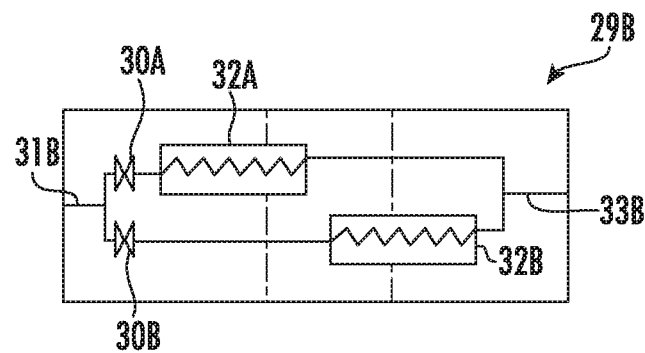
FIG. 3 is a schematic view illustrating another example modular heat exchanger unit for use in the transport refrigeration system of FIG. 1.

FIG. 3 schematically illustrated the second modular unit 29B. The modular unit 29B includes the first absorption heat exchanger 32A, the second absorption heat exchanger 32B, the first expansion device 30A, and the second expansion device 30B. A single inlet 31B feeds refrigerant from the refrigeration system 20 into the second modular unit 29B and a single outlet 33B directs the refrigerant from the second modular unit 29B back into the refrigeration system 20. The single inlet 31B attaches to the single outlet 25 (FIG. 1) of the refrigeration system 20 through welding, bonding, brazing, or another similar technique. Similarly, the single outlet 33B of the second modular unit 29B attaches to the single inlet 27 (FIG. 1) of the refrigeration system 20 through welding, bonding, brazing, or another similar technique.

The first and second modular units 29A, 29B are easily interchanged in refrigeration system 20 from within the cargo space 22 by separating one of the single inlets 31A, 31B on a respective first and second modular unit 29A, 29B from the single outlet 25 on the refrigeration system 20 and separating one of the single outlets 33A, 33B of a respective first and second modular unit 29A, 29B from the single inlet 27 to the refrigeration system 20. Once one of the first and second the modular units 29A, 29B is removed from the refrigeration system 20, the desired first or second modular unit 29A, 29B can then be installed in the refrigeration system 20 as outlined above.

Figure 4:
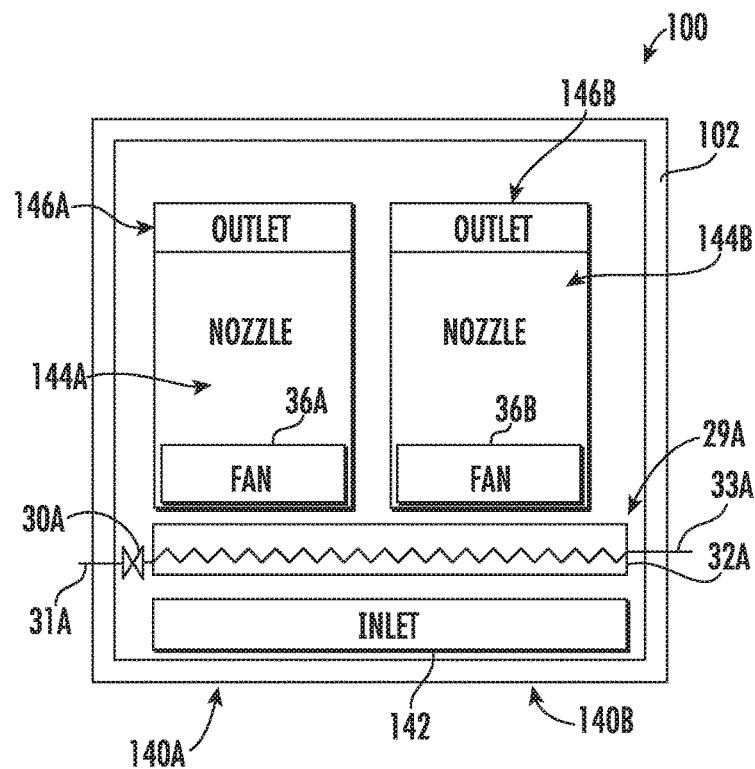
FIG. 4 is a schematic view illustrating the example modular unit of FIG. 2 incorporated into a transport refrigeration assembly.

FIG. 4 illustrates air flow through an example transportation refrigeration assembly 100 having a frame 102 supporting the first modular unit 29A. The air flows from the cargo space 22 through a first passageway 140A and a second passageway 140B back into the cargo space 22. The first passageway 140A includes a passageway inlet 142 that accepts air from the cargo space 22. From the passageway inlet 142, the air is drawn by the first fan 36A over the first absorption heat exchanger 32A and into a first nozzle 144A. From the first nozzle 144A, the air exits the first passageway 140A through a first passageway outlet 146A and travels back into the cargo space 22.

Similarly, the second passageway 140B includes the passageway inlet 142 that accepts air from the cargo space 22 into the second passageway 140B. From the passageway inlet 142, the air is drawn by the second fan 36B over the first absorption heat exchanger 32A and into a second nozzle 144B. From the second nozzle 144B, the air exits the second passageway 140B through a second passageway outlet 146B and travels back into the cargo space 22.

Figure 5:
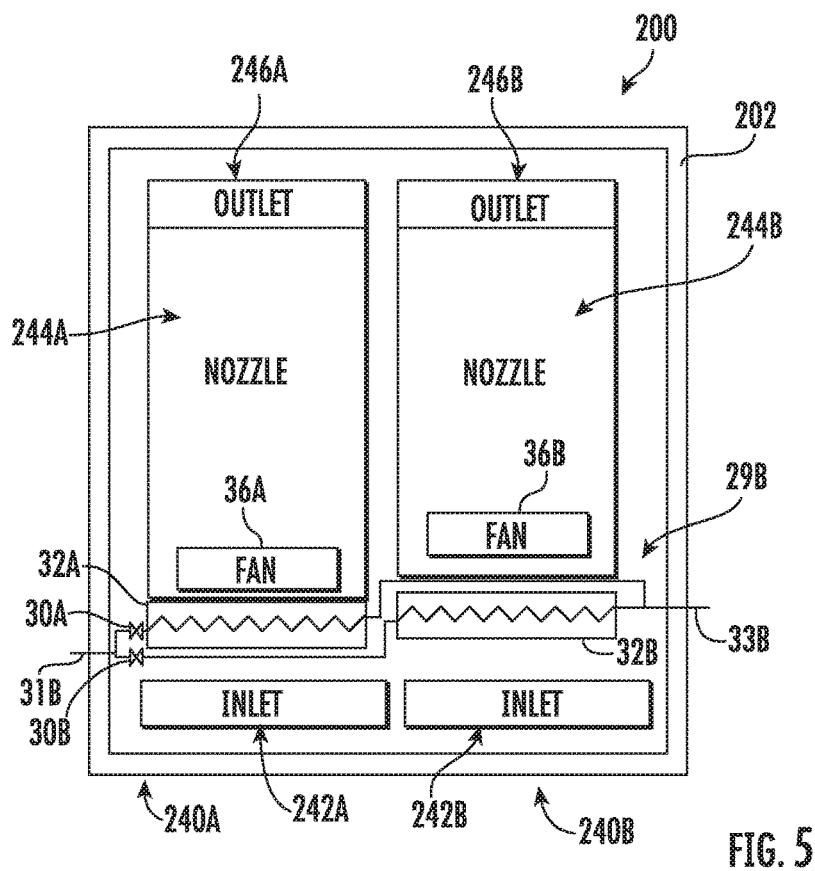
FIG. 5 is a schematic view illustrating the example modular unit of FIG. 3 incorporated into a transport refrigeration assembly.

FIG. 5 schematically illustrates air flow through an example transportation refrigeration assembly 200 having a frame 202 supporting the second modular unit 29B. The air flow from the first and second compartments 22A, 22B through a respective first and second absorption heat exchanger 32A, 32B. The air flow from the first compartment 22A flows through a first compartment passageway 240A and back into the first compartment 22A. The first compartment passageway 240A includes a first compartment passageway inlet 242A that accepts air from the first compartment 22A into the first compartment passageway 240A. From the first compartment passageway inlet 242A, the air is drawn by the first fan 36A over the first absorption heat exchanger 32A and into a first nozzle 244A. From the first nozzle 244A, the air exits the first compartment passageway 240A through a first compartment passageway outlet 246A and travels back into the first compartment 22A.

Similarly, the air flow from the second compartment 22B flows through a second compartment passageway 240B and back into the second compartment 22B. The second compartment passageway 240B includes a second compartment passageway inlet 242B that accepts air from the second compartment 22B into the second compartment passageway 240B. From the second compartment passageway inlet 242B, the air is drawn by the second fan 36B over the second heat absorption heat exchanger 32B and into a second nozzle 244B. From the second nozzle 244B, the air exits the second compartment passageway 240B through a second compartment passageway outlet 246B and travels back into the second compartment 22B.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A method of retrofitting a transposition refrigeration assembly comprising the steps of:
removing a first modular heat exchanger unit from a modular compartment of a refrigeration assembly, wherein the refrigeration assembly includes a first cooling fluid outlet and a second cooling fluid outlet each in fluid communication with the modular compartment; and
installing a second modular heat exchanger unit in the modular compartment, wherein the first modular heat exchanger unit and the second modular heat exchanger unit include an unequal number of absorption heat exchangers.

2. The method of claim 1, wherein the removing step includes:
separating a single inlet to the first modular heat exchanger unit from a single outlet from a refrigeration circuit; and
separating a single outlet from the first modular heat exchanger unit from a single inlet to the refrigeration circuit.

3. The method of claim 2, wherein the installing step includes:
attaching the single inlet to the second modular heat exchanger unit with the single outlet from the refrigeration circuit; and
attaching the single outlet from the second modular heat exchanger unit to the single inlet to the refrigeration circuit.

4. The method of claim 3, wherein one of the first modular heat exchanger unit and the second modular heat exchanger unit includes a pair of expansion devices and a pair of absorption heat exchangers and the other of the first modular heat exchanger unit and the second modular heat exchanger unit includes a single expansion device and a single absorption heat exchanger.

* * * * *

UNITED STATES PATENT AND TRADEMARK OFFICE
CERTIFICATE OF CORRECTION

PATENT NO. : 11,846,457 B2
APPLICATION NO. : 17/045951
DATED : December 19, 2023
INVENTOR(S) : Kosakowski et al.

Page 1 of 1

It is certified that error appears in the above-identified patent and that said Letters Patent is hereby corrected as shown below:

In the Claims

Claim 1, Column 6, Line 28, change "transposition" to --transportation--

Signed and Sealed this
Twenty-third Day of July, 2024

Katherine Kelly Vidal
*Director of the United States Patent and Trademark Office*